United States Patent
Ando et al.

(10) Patent No.: US 7,864,934 B2
(45) Date of Patent: Jan. 4, 2011

(54) TELEPHONE USED IN A TELEPHONE SYSTEM FOR TRANSMITTING DATA FROM AN AUTHORIZED TELEPHONE WITH SPEECH AUTHORITY TO AN UNAUTHORIZED TELEPHONE WITHOUT SPEECH AUTHORITY

(75) Inventors: Tomohiro Ando, Yokohama (JP); Rei Takahashi, Tokyo (JP); Kazuka Higashi, Osaka (JP); Takeshi Iitaka, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 979 days.

(21) Appl. No.: 11/350,940

(22) Filed: Feb. 10, 2006

(65) Prior Publication Data

US 2006/0189305 A1    Aug. 24, 2006

(30) Foreign Application Priority Data

Feb. 21, 2005    (JP)    ............... P2005-044577

(51) Int. Cl.
*H04M 1/56*    (2006.01)
*H04M 15/06*    (2006.01)
*H04M 3/42*    (2006.01)

(52) U.S. Cl. .................. 379/142.05; 379/202.01; 379/207.01

(58) Field of Classification Search ............ 379/142.01, 379/142.17, 201.01, 203.01, 207.01, 201.04, 379/88.02, 88.19, 142.05, 202.01; 370/260, 370/261, 265, 266; 348/14.07–14.09; 709/204
See application file for complete search history.

(56) References Cited

U.S. PATENT DOCUMENTS 7,580,375 B1 *   8/2009   Friedrich et al. ............ 370/260

| 2003/0081751 A1 |   | 5/2003 | Berstis |
| 2003/0119540 A1 |   | 6/2003 | Mathis |
| 2003/0158900 A1 | * | 8/2003 | Santos ................... 709/205 |
| 2003/0223562 A1 | * | 12/2003 | Cui et al. .............. 379/202.01 |
| 2004/0266468 A1 |   | 12/2004 | Brown et al. |

FOREIGN PATENT DOCUMENTS

| CN | 1738448 A    | 2/2006 |
| JP | 6-303324     | 10/1994 |
| JP | 11-177952    | 7/1999 |
| JP | 2003-219047  | 7/2003 |

(Continued)

*Primary Examiner*—Quoc D Tran
(74) *Attorney, Agent, or Firm*—Oblon, Spivak, McClelland, Maier & Neustadt, L.L.P.

(57) ABSTRACT

An object is to provide a telephone enabling a user of a telephone to readily recognize which telephone user is a source of voice under transmission. This telephone 10 has a receiver 102 for receiving telephone information to specify each of an authorized telephone and unauthorized telephones, a display surface 100 for displaying predetermined information based on the received telephone information, and a display control part 105 for specifying a content of the predetermined information, based on the telephone information received by the receiver 102, and for displaying the content on the display surface 100. The display control part 105 fixedly displays user information to specify a user of the authorized telephone, in a partial region of the display surface 100, and displays at least part of user information to specify users of telephones except for the concerned telephone 10 among the authorized telephone and unauthorized telephones, in a remaining region except for the partial region of the display surface 100.

8 Claims, 6 Drawing Sheets

|  | TELEPHONE INFORMATION | USER INFORMATION | INFORMATION INDICATING COMMUNICATION STATE |
|---|---|---|---|
| AUTHORIZED TELEPHONE | 090xxxxxx1 | A | NOT DISPLAYED |
| UNAUTHORIZED TELEPHONES | 090xxxxxx2 | B | IN SPEECH |
|  | 090xxxxxx3 | C | DEPARTURE FROM SPEECH RANGE |
|  | 090xxxxxx4 | D | NO RESPONSE |
|  | ⋮ | ⋮ | ⋮ |

FOREIGN PATENT DOCUMENTS

| | | |
|---|---|---|
| JP | 2004-32229 | 1/2004 |
| JP | 2004-222194 | 8/2004 |
| JP | 2004-274128 | 9/2004 |
| JP | 2004-297519 | 10/2004 |
| WO | WO 99/34628 | 7/1999 |

* cited by examiner

Fig.3

|  | TELEPHONE INFORMATION | USER INFORMATION | INFORMATION INDICATING COMMUNICATION STATE |
|---|---|---|---|
| AUTHORIZED TELEPHONE | 090xxxxxx1 | A | NOT DISPLAYED |
| UNAUTHORIZED TELEPHONES | 090xxxxxx2 | B | IN SPEECH |
| | 090xxxxxx3 | C | DEPARTURE FROM SPEECH RANGE |
| | 090xxxxxx4 | D | NO RESPONSE |
| | ⋮ | ⋮ | ⋮ |

TELEPHONE USED IN A TELEPHONE SYSTEM FOR TRANSMITTING DATA FROM AN AUTHORIZED TELEPHONE WITH SPEECH AUTHORITY TO AN UNAUTHORIZED TELEPHONE WITHOUT SPEECH AUTHORITY

BACKGROUND OF THE INVENTION

1. Field of the Invention

The present invention relates to a telephone used in a telephone system for transmitting voice data transmitted from an authorized telephone with speech authority, to a plurality of unauthorized telephones without speech authority.

2. Related Background Art

The telephones proposed for simultaneous conversation among three or more persons include those enabling a bidirectional voice call among the telephones used by the three or more persons (Japanese Patent Application Laid-Open No. 2004-222194).

SUMMARY OF THE INVENTION

As a telephone for simultaneous conversation among three or more persons, there is a proposed telephone in a form different from those described in the above Patent Document 1. This telephone is one used in a telephone system for transmitting voice data transmitted from an authorized telephone with speech authority, to a plurality of unauthorized telephones without speech authority.

When a user intending to initiate a speech manipulates his or her own telephone, the telephone used in the telephone system transmits its information to the network side. In accordance with this transmitted information, the network side provides the source telephone with speech authority and handles it as an authorized telephone. Thereafter, the network side handles receiver telephones as receive-only unauthorized telephones and transmits voice data from the authorized telephone to the unauthorized telephones. Therefore, voice uttered by the user of the authorized telephone is transmitted as voice data to the plurality of unauthorized telephones, thus enabling simultaneous transmission of information.

Incidentally, it can be contemplated that the following case will occur with increase in the number of telephones participating in the telephone system: with transmission of voice data, it is difficult for the receiver users to specify who uttered the voice as a basis of the voice data.

An object of the present invention is therefore to provide a telephone used in a telephone system for transmitting voice data transmitted from an authorized telephone with speech authority, to a plurality of unauthorized telephones without speech authority, which enables easy recognition of which telephone user uttered voice under transmission.

In order to solve the above problem, a telephone of the present invention is a telephone used in a telephone system for transmitting voice data transmitted from an authorized telephone with speech authority, to a plurality of unauthorized telephones without speech authority, comprising: receiving means for receiving telephone information to specify each of the authorized telephone and unauthorized telephones; a display surface for displaying predetermined information based on the received telephone information; and display controlling means for specifying a content of the predetermined information, based on the telephone information received by the receiving means, and for displaying the content on the display surface, wherein the display controlling means fixedly displays user information to specify a user of the authorized telephone, in a partial region of the display surface and displays at least part of user information to specify users of the telephones except for the concerned telephone among the authorized telephone and unauthorized telephones, in a remaining region except for the partial region of the display surface.

According to the present invention, the display controlling means displays the user information based on the telephone information to specify each of the authorized telephone and unauthorized telephones, on the display surface. On this occasion, the display controlling means fixedly displays the user information to specify the user of the authorized telephone, in the partial region of the display surface. For this reason, a receiver user can check the familiar fixed region to readily recognize which telephone is a source of voice of a user under transmission. In addition, at least part of the user information to specify the users of the telephones except for the concerned telephone is displayed in the remaining region except for the partial region of the display surface. For this reason, more user information can be displayed on the display surface of the telephone.

In the present invention, the display controlling means may be arranged to display the user information to specify the user of the authorized telephone, in a manner different from the user information to specify the users of the unauthorized telephones, in the user information displayed on the display surface. When the user information to specify the user of the authorized telephone is displayed in a form different from the user information to specify the users of the unauthorized telephones, so as to highlight the user information of the authorized telephone for a receiver user upon checking the display surface, the receiver user can readily recognize the telephone in transmission of the voice data.

In the present invention, the display controlling means may be configured to display information indicating communication states of the unauthorized telephones in the remaining region of the display surface. When a user acquires the information about the users of the unauthorized telephones by checking the remaining region of the display surface, the user can acquire not only the user information to specify the users of the unauthorized telephones, but also the communication states of the telephones used by the users.

In the present invention, when the receiving means further receives the telephone information after the display controlling means displayed the predetermined information on the display surface, the display controlling means may be configured to specify the predetermined information to be displayed on the display surface, based on the further received telephone information. For example, when the speech authority is transferred from one telephone to another, the receiving means further receives the telephone information of each of the authorized telephone and unauthorized telephones. Then the display controlling means displays the predetermined information the content of which is specified based on the new telephone information, on the display surface. For this reason, in a situation in which the source of voice data is changed from one to another so as to continuously transmit voice data from different sources, each receiver user can readily recognize which telephone is a source of voice data under transmission, based on voice uttered by a user using it, at each time.

The present invention enables the user to readily recognize which telephone user is a source of voice under transmission.

BRIEF DESCRIPTION OF THE DRAWINGS

The present invention may be more readily described with reference to the accompanying drawings, in which:

FIG. 3 is an illustration for explaining telephone information, user information, and information indicating communication states of unauthorized telephones in an embodiment of the present invention.

DESCRIPTION OF THE PREFERRED EMBODIMENTS

The expertise of the present invention can be readily understood in view of the following detailed description with reference to the accompanying drawings presented for illustrative purposes only. Subsequently, embodiments of the present invention will be described with reference to the accompanying drawings. The same portions will be denoted by the same reference symbols as much as possible, without redundant description.

Figure 1:
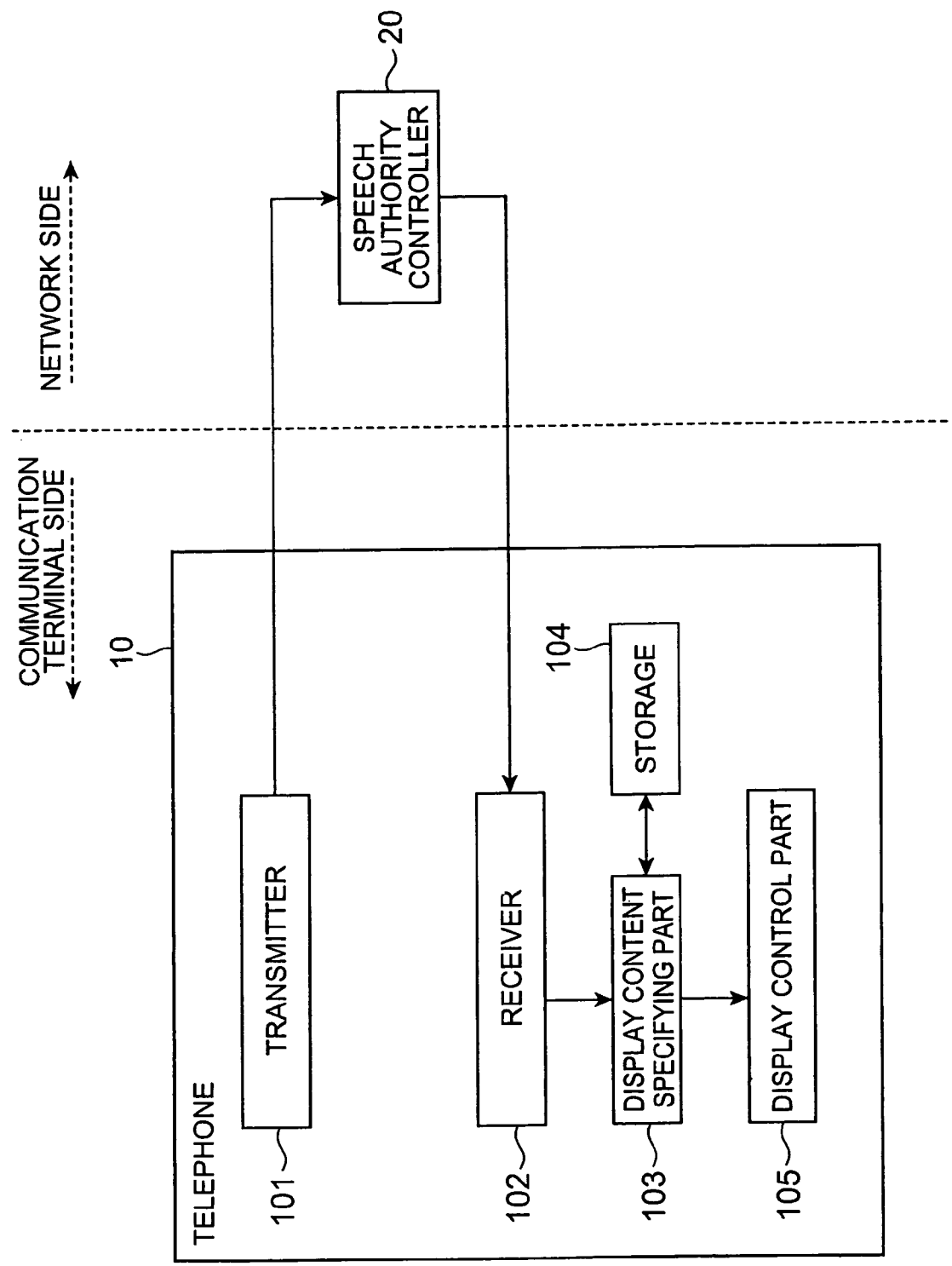
FIG. 1 is an illustration for explaining a telephone as an embodiment of the present invention.

First, a configuration of telephone 10 being an embodiment of the present invention will be described with reference to FIG. 1. The telephone 10 is a communication terminal used by each user for conversation among plural persons in the aforementioned telephone system, and functionally includes a display surface 100 (cf. FIG. 4), a transmitter 101, a receiver (receiving means) 102, a display content specifying part 103, a storage part 104, and a display control part (display controlling means) 105.

Figure 2:
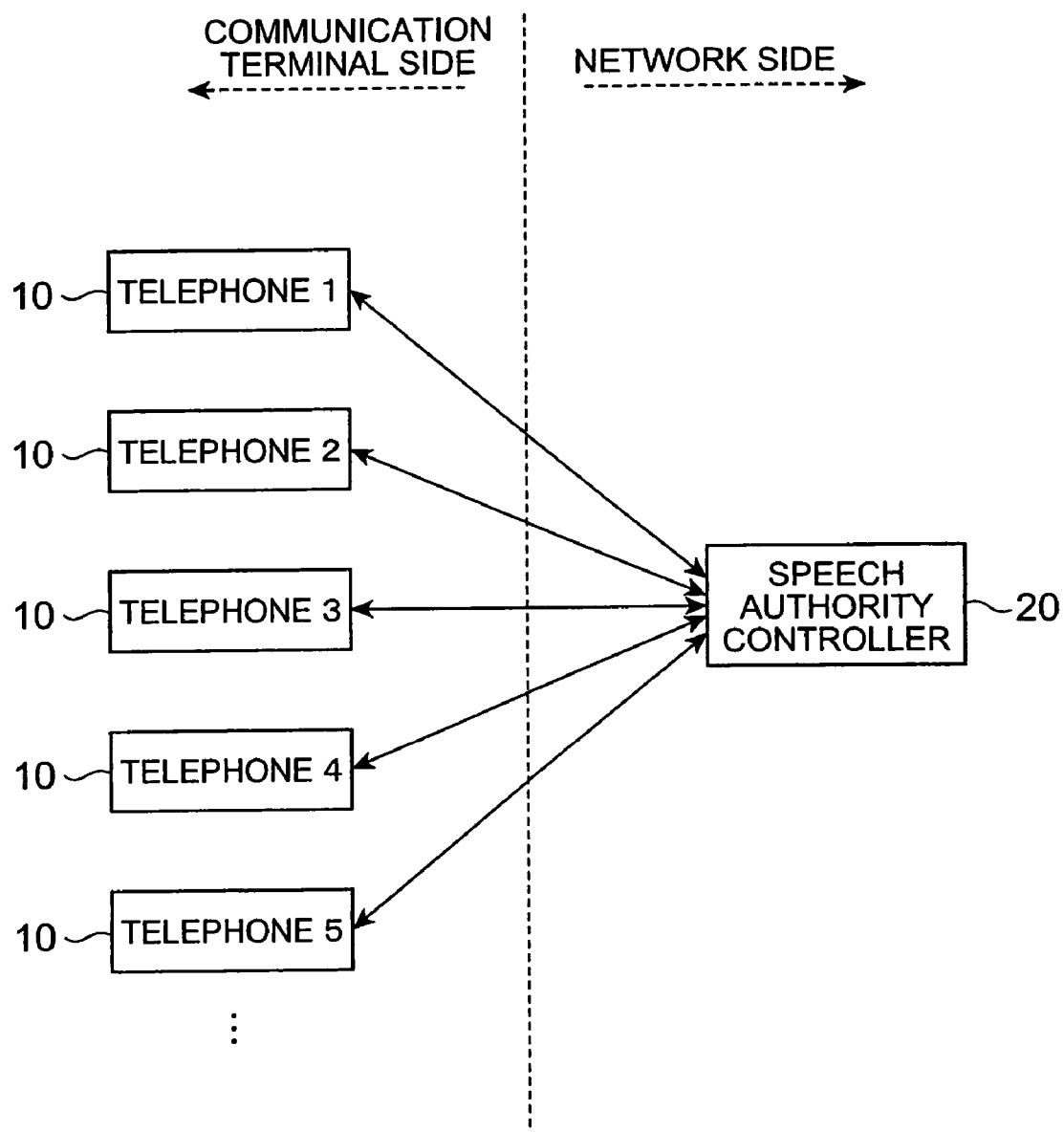
FIG. 2 is an illustration for explaining telephones as an embodiment of the present invention.

A telephone is configured so as to be able to communicate with other telephones through a network. The network encompasses a voice communication network for voice speech, a packet communication network for data communication, or a line switching network for data communication, and includes a speech authority controller 20 as a functional component. In the present embodiment, for example as shown in FIG. 2, there are a plurality of telephones 10 and a network provided, thereby constituting a telephone system for transmitting voice data transmitted from an authorized telephone with speech authority, to a plurality of unauthorized telephones without speech authority, through the network.

The transmitter 101 is a part that transmits a signal about speech authority to the network side, for example, when a user intending to initiate a speech manipulates an input device (not shown) of the host telephone. The signal about speech authority transmitted to the communication network by the telephone 10 can be, for example, a speech authority acquisition signal transmitted on the occasion of acquiring the speech authority and transmitting voice data, a speech authority renunciation signal transmitted on the occasion of renouncing the already acquired speech authority and suspending transmission of voice data, or a speech withdrawal signal transmitted on the occasion of withdrawing from a speech in progress.

The receiver 102 is a part that receives telephone information which the network side, receiving the signal about speech authority transmitted by the transmitter 101, transmits after execution of control about the speech authority. The telephone information includes unique numbers of telephones to specify each of the authorized telephone with speech authority, and unauthorized telephones without speech authority. The receiver 102 further receives information indicating communication states of the unauthorized telephones, from the network side. The communication states of the unauthorized telephones include, for example, a speech-enabled state, a departure from a speech-enabled range, no response, and so on. The receiver 102 outputs the received telephone information and information indicating the communication states of the unauthorized telephones, to the display content specifying part 103.

The display content specifying part 103 is a part that specifies the contents of information to be displayed on the display surface, based on the telephone information and the information indicating the communication states of the unauthorized telephones, supplied from the receiver 102. More specifically, the display content specifying part 103 searches the storage part 104, based on the fed telephone information, to acquire user information to specify the users using the concerned telephones. Information about the other users to participate in the voice speech is preliminarily stored in the storage part 104, and information to specify each user, e.g., a user name is stored in correspondence to a unique number of a telephone (telephone information) used by the user. The display content specifying part 103 correlates the information indicating the communication states of the unauthorized telephones fed from the receiver 102, to the user information of the unauthorized telephones.

FIG. 3 is an illustration showing the correspondence among the telephone information, the user information to specify the users of the authorized telephone and unauthorized telephones, and the communication states of the unauthorized telephones, made by the display content specifying part 103. For example, suppose the telephone information received from the network side by the receiver 102 designates "090xxxxxx1" as the authorized telephone with speech authority. Then, the display content specifying part 103 searches the storage part 104 for the user information corresponding to the telephone with the unique number of "090xxxxxx1," and finds the user name "A." For the unauthorized telephones, the display content specifying part 103 also retrieves the user names from the unique numbers of the telephones in the same manner. For the unauthorized telephones, it further performs a process of correlating the information indicating the communication states, to the user information, and, for example, the unauthorized telephone with the unique number of "090xxxxxx2" is associated with "in speech" as its communication state. The display content specifying part 103 outputs to the display control part 105, the user information to specify the users of the authorized telephone and unauthorized telephones, and the information indicating the communication states of the unauthorized telephones.

The display control part 105 is a part that receives the user information to specify the users of the authorized telephone and unauthorized telephones, and the information indicating the communication states of the unauthorized telephones, from the display content specifying part 103, and that fixedly displays the user information to specify the user of the authorized telephone, in a partial region of the display surface. The display control part 105 also displays at least part of the user information to specify the users of the telephones except for the concerned telephone among the authorized telephone and unauthorized telephones, in the remaining region except for the partial region of the display surface. In displaying the information on the display surface, the user information to specify the user of the authorized telephone is displayed in a form different from the user information to specify the users of the unauthorized telephones.

Figure 4:
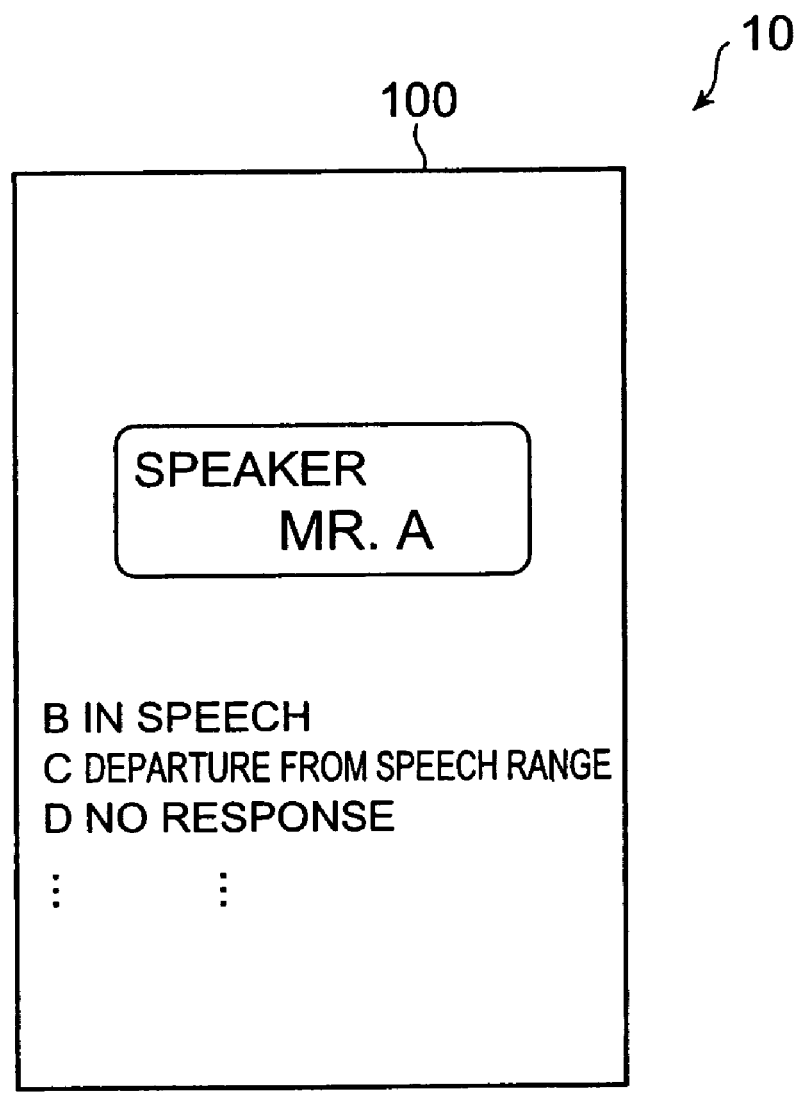
FIG. 4 is an illustration for explaining a display surface of a telephone as an embodiment of the present invention.
Figure 5:
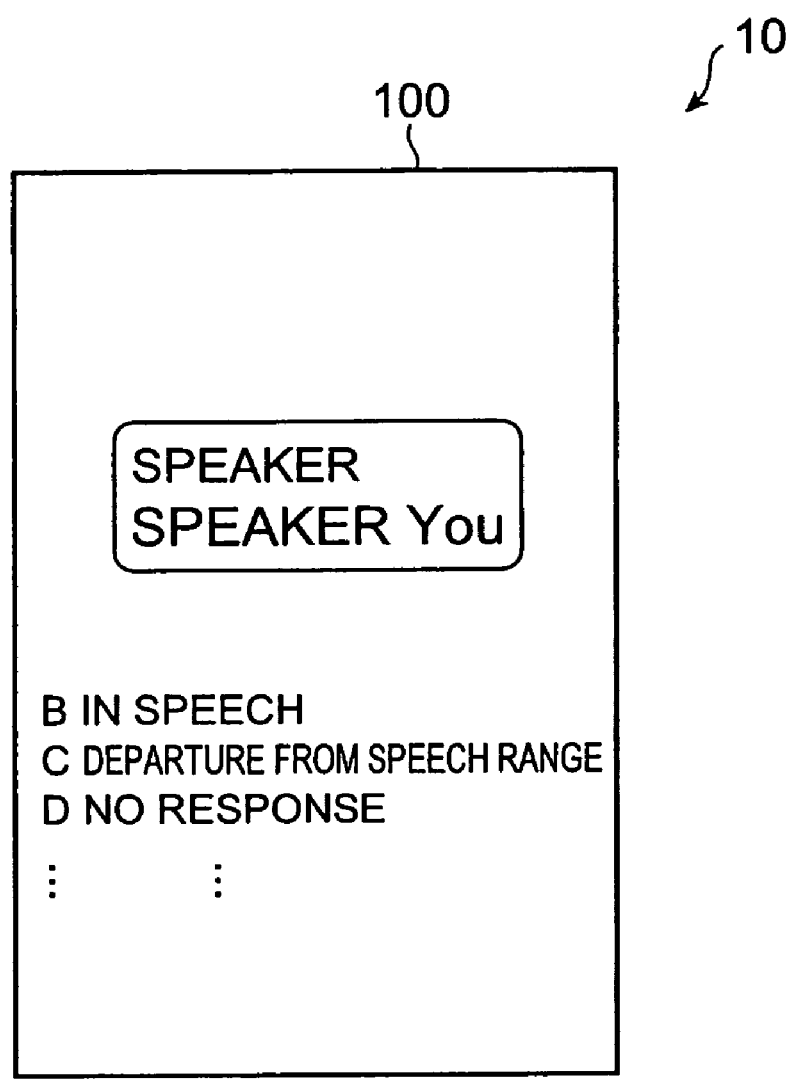
FIG. 5 is an illustration for explaining a display surface of a telephone as an embodiment of the present invention.

FIGS. 4 and 5 are illustrations each of which shows an example in which the user information to specify the users of the authorized telephone and unauthorized telephones and the information indicating the communication states of the unauthorized telephones is displayed on the display surface 100 of telephone 10. FIG. 4 shows display surface 100 of an unauthorized telephone, for example, in a case where the user of the authorized telephone with speech authority is "A" and where the other users are users of unauthorized telephones without speech authority. In the present embodiment, as described above, "A," the user of the authorized telephone, is displayed in the different display form from the users of the unauthorized telephones. Namely, in order to highlight the user information of the authorized telephone for each receiver user, the user name "A" of the authorized telephone is displayed, for example, in a large letter in the upper part of the display surface 100. FIG. 5 is a display surface in a case where the concerned telephone is the authorized telephone, i.e., where the user of the concerned telephone is "A" himself. When the concerned telephone is the authorized telephone as in this case, "You" is displayed instead of the display of the user name.

There is a limit to the area of the display surface 100 of the telephone. It can also be contemplated that the number of users participating in a speech becomes as many as 20 or more, for example. For this reason, the present embodiment is arranged not to display the user information of the concerned telephone on the occasion of displaying the user information of the unauthorized telephones, whereby the user information of more unauthorized telephones can be displayed on the aforementioned remaining region of the display surface 100 of the telephone.

On the occasion of displaying the users of the unauthorized telephones, the communication states of the unauthorized telephones used by the users are further displayed in addition to the user names. In the present embodiment, for example as shown in FIGS. 4 and 5, the communication states of the unauthorized telephones are "in speech," "departure from speech range," "no response," etc. displayed beside the user names.

The telephone 10 described above performs transmission/reception of voice data to and from the other telephones 10 through the network. The network is constructed including the speech authority controller 20 for controlling the speech authority given to the telephone side in a speech among plural persons. More specifically, the speech authority controller 20 receives from the transmitter 101 of the telephone side, a signal about speech authority, such as a speech authority acquisition signal, a speech authority renunciation signal, or a speech withdrawal signal. The speech authority controller 20 grasps the communication states of the telephones in the speech. Then the speech authority controller 20 controls the speech authority given to the telephone side, in accordance with the communication states at each point, based on the signal about speech authority and the information about the communication states of the telephones. The speech authority controller 20 controls the speech authority, for example, in such a manner that, when the telephone with speech authority is changed to another, the controller adds information indicating that the concerned telephone is handled as the authorized telephone, to the telephone information to update the telephone information. Then the speech authority controller 20 transmits the updated telephone information and the information indicating the communication states of the unauthorized telephones, to the receiver 102 of telephone 10.

Figure 6:
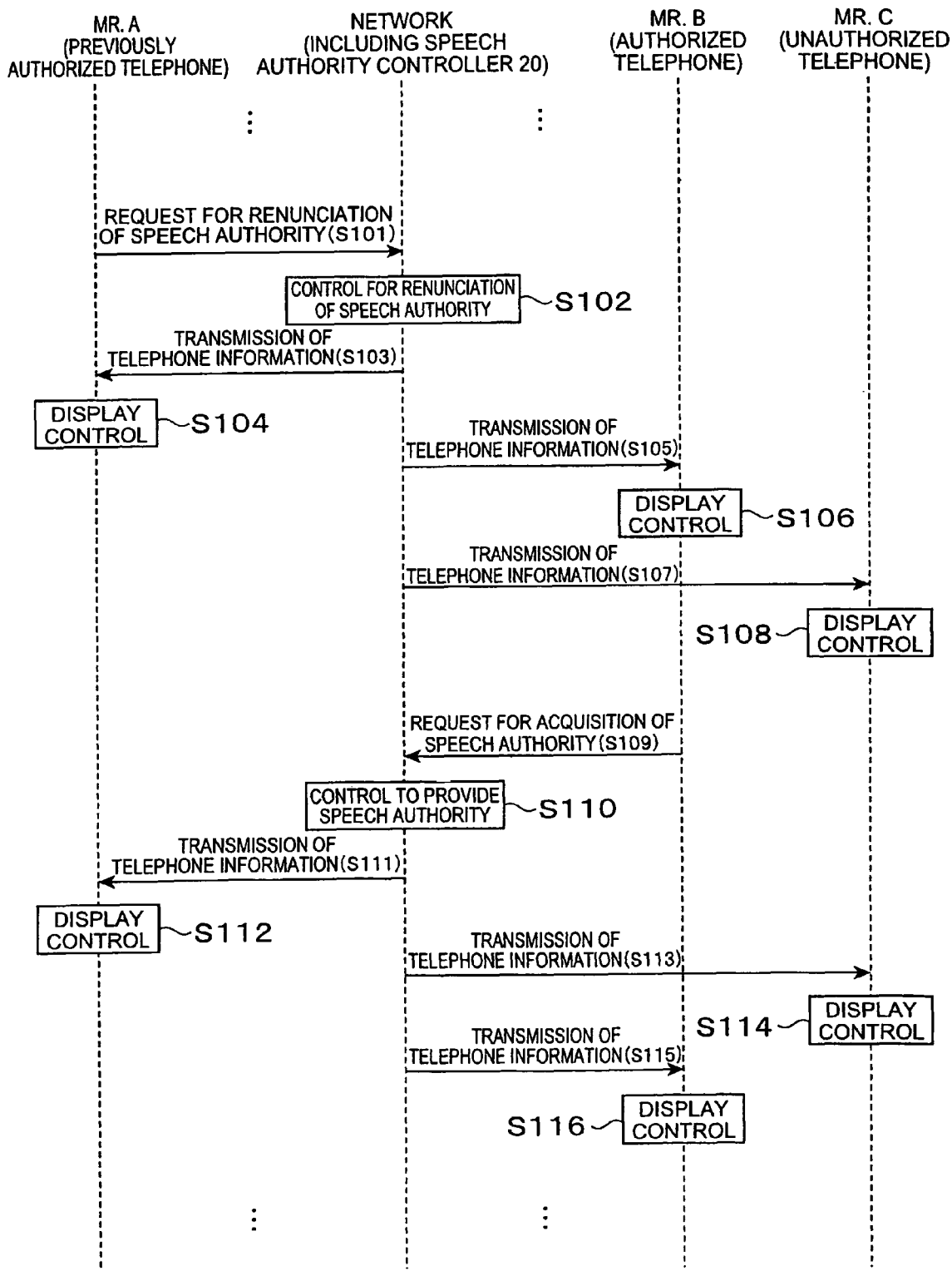
FIG. 6 is a flowchart for explaining a procedure of performing continuous transmission/reception of voice data, using the telephone of FIG. 1.

Subsequently, a procedure of performing continuous transmission/reception of voice data using telephones 10 according to the present embodiment will be described with reference to the flowchart of FIG. 6. The present embodiment describes an example of a situation in which the speech authority is transferred from the telephone used by A (previously authorized telephone) to the telephone used by B (authorized telephone). It can be contemplated that 20 or more persons participate in a voice speech, but the present embodiment will be described using an example of transmission/reception of voice data among three telephones, in order to simplify the description.

First, the transmitter 101 of the previously authorized telephone of A with speech authority at the present time transmits a speech authority renunciation signal to request renunciation of speech authority, to the network side (step S101).

The speech authority controller 20 on the network side effects the renunciation of speech authority of the previously authorized telephone owned by A, based on the speech authority renunciation signal received from the transmitter 101 of the previously authorized telephone of A. Then the speech authority controller 20 adds the information indicating that the telephone of A is handled as an unauthorized telephone after this point, to the telephone information to update the telephone information (step S102).

Then the network side transmits the updated telephone information to each telephone 10 (step S103, step S105, and step S107). The display content specifying part 103 and storage part 104 of each telephone receiving the updated telephone information specify the predetermined information to be displayed on the display surface 100, based on the received telephone information, and the display control part 105 displays the specified predetermined information on the display surface 100 (step S104, step S106, and step S108). This results in notifying the users participating in the transmission/reception of voice data, that none of the telephones is provided with speech authority at the present time.

Mr. B, notified that none of the telephones is provided with speech authority at the present time, then performs an operation for acquiring speech authority, using the input device (not shown) of the telephone of his own. The transmitter 101 of the telephone used by Mr. B transmits a speech authority acquisition signal to the network side (step S109).

The speech authority controller 20 on the network side receives the speech authority acquisition signal transmitted by the transmitter 101 of the telephone used by B. The speech authority controller 20 provides the telephone of B with speech authority, based on the received speech authority acquisition signal. For provision of the speech authority, the speech authority controller may be arranged to give consideration to the communication state of the telephone used by the user sending the request for acquisition of speech authority, and to provide the telephone with speech authority only if the communication state is good. Then the speech authority controller 20 adds information indicating that the telephone of B is handled as an authorized telephone after this point, to the telephone information to update the telephone information (step S110).

The network side transmits the updated telephone information to each telephone (step S111, step S113, and step S115). The display content specifying part 103 and storage part 104 of each telephone receiving the updated telephone information specify the predetermined information to be displayed on the display surface 100, based on the received telephone information, and the display control part 105 displays the specified predetermined information on the display surface 100 (step S112, step S114, and step S116). This results in notifying the users of the receiver telephones participating in the transmission/reception of voice data, that the telephone of B is provided with speech authority from this point, and voice data to be transmitted is voice data based on a speech of B.

Subsequently, the action and effect of the present embodiment will be described. In the telephone 10 of the present embodiment, the display control part 105 fixedly displays the user information to specify the user of the authorized telephone, in the partial region of the display surface 100, on the occasion of displaying the user information based on the telephone information to specify the users of the authorized telephone and unauthorized telephones, on the display surface 100. This enables each receiver user to readily recognize which telephone user uttered the voice under transmission, by checking the fixed region already familiar to the user. Since it displays at least part of the user information to specify the users of the telephones except for the concerned telephone, in the remaining region except for the partial region of the display surface 100, more user information can be displayed on the display surface 100 of the telephone.

In the present embodiment, the display control part 105 displays the user information to specify the user of the authorized telephone, in the form different from the user information to specify the users of the unauthorized telephones, on the occasion of displaying the user information on the display surface 100. For this reason, when the receiver user checks the display surface 100, the user information to specify the user of the authorized telephone becomes highlighted, whereby the receiver user can readily recognize the telephone involved in transmission of voice data.

In the present embodiment, the display control part 105 displays the information indicating the communication states of the unauthorized telephones, in the remaining region of the display surface 100. This permits the user to further acquire the communication states of the telephones used by the users, in addition to the user information to specify the users of the unauthorized telephones, on the occasion of checking the remaining region of the display surface to acquire the information about the users of the unauthorized telephones.

In the present embodiment, for example, when the speech authority is transferred from one telephone to another telephone, the receiver 102 further receives the telephone information of each of the authorized telephone and unauthorized telephones. Then the display control part 105 displays the predetermined information the contents of which are specified based on the new telephone information, on the display surface 100. For this reason, in cases where the source of voice data is changed from one telephone to another telephone and where voice data from different sources is continuously transmitted, each receiver user is able to readily recognize which telephone user is the source of voice data under transmission of voice at each point.

The present invention is not limited to the above embodiments. Various situations can be contemplated as situations about the transfer of speech authority; for example, a case where a new user comes to participate in a voice speech in progress, a case where an existing user withdraws from a voice speech, and so on. In these cases, the transmitter 101 of the telephone 10 transmits a signal about speech authority to the network side and the speech authority controller 20 on the network side performs the control based on the signal about speech authority. The network side transmits the updated telephone information to each telephone. Then the display control part 105 of each telephone displays the predetermined contents specified based on the new telephone information by the display content specifying part 103 and storage part 104, on the display surface 100.

In the above embodiments, as illustrated in FIGS. 4 and 5, the user information of the authorized telephone and the user information of the unauthorized telephones was displayed in parallel. However, it is also possible to separately display the user information of the authorized telephone and the user information of the unauthorized telephones, by switching of the screen based on movement of a tag or manipulation of a specific button. It is also possible to permit the user to set in advance whether the user information of the authorized telephone and the user information of the unauthorized telephones is displayed in parallel or displayed separately by switching, according to user's preference.

What is claimed is:

1. A telephone in a telephone system for transmitting voice data transmitted from an authorized telephone with speech authority granted from a speech authority controller, to a plurality of unauthorized telephones without speech authority, comprising:

a transmitting unit to request authorization and un-authorization from the speech authority controller to transmit voice data, the speech authority controller, in response to an authorization request from a requesting telephone, authorizing the requesting telephone and un-authorizing all telephones other than the requesting telephone;

receiving means for receiving telephone information to specify users of each of the authorized telephone and the unauthorized telephones from the speech authority controller;

a display surface for displaying predetermined information based on the received telephone information; and display controlling means for specifying a content of the predetermined information, based on the telephone information received by the receiving means, and for displaying the content on the display surface, wherein the display controlling means fixedly displays user information to specify a user of the authorized telephone, in a partial region of the display surface, and displays at least part of user information to specify users of telephones except for the concerned telephone among the authorized telephone and the unauthorized telephones, in a remaining region except for the partial region of the display surface.

2. The telephone according to claim 1, wherein the display controlling means displays the user information to be displayed on the display surface, in such a manner that the user information to specify the user of the authorized telephone is displayed in a form different from the user information to specify the users of the unauthorized telephones.

3. The telephone according to claim 1 or 2, wherein the display controlling means displays information indicating communication states of the unauthorized telephones, in the remaining region of the display surface.

4. The telephone according to claim 1 or 2, wherein, when the receiving means receives the telephone information after the display controlling means displayed the predetermined information on the display surface, the display controlling means specifies the predetermined information to be displayed on the display surface, based on the received telephone information.

5. The telephone according to claim 3, wherein, when the receiving means receives the telephone information after the display controlling means displays the predetermined information on the display surface, the display controlling means specifies the predetermined information to be displayed on the display surface, based on the received telephone information.

6. A telephone in a telephone system for transmitting voice data transmitted from an authorized telephone with speech authority granted from a speech authority controller, to a plurality of unauthorized telephones without speech authority, comprising:
   a transmitting unit configured to request authorization and un-authorization from the speech authority controller to transmit voice data, the speech authority controller, in response to an authorization request from a requesting telephone, authorizing the requesting telephone and un-authorizing all telephones other than the requesting telephone;
   a receiving unit configured to receive telephone information to specify users of each of the authorized telephone and the unauthorized telephones from the speech authority controller;
   a display surface configured to display predetermined information based on the received telephone information; and
   a display controlling unit configured to specify a content of the predetermined information, based on the telephone information received by the receiving unit, and to display the content on the display surface,
   wherein the display controlling unit is configured to fixedly display user information to specify a user of the authorized telephone, in a partial region of the display surface, and to display at least part of user information to specify users of telephones except for the concerned telephone among the authorized telephone and the unauthorized telephones, in a remaining region except for the partial region of the display surface.

7. A speech authority control method of transmitting and receiving voice data in a telephone system, the method comprising:
   receiving a request for acquisition of speech authority from a first telephone to a speech authority controller;
   authorizing the first telephone to transmit voice data to a second telephone based on the request for acquisition of speech authority from the first telephone to the speech authority controller, the speech authority controller, when authorizing the first telephone, un-authorizing all telephones other than the first telephone;
   routing, by the speech authority controller, voice data transmitted from the first telephone to the second telephone when the first telephone is authorized in the authorizing;
   transmitting telephone information including information identifying a user of the first telephone from the speech authority controller to the first and second telephones when the voice data transmitted from the first telephone is routed to the second telephone;
   displaying the transmitted telephone information on the first and second telephones;
   transmitting a request for renunciation of speech authority from the first telephone to the speech authority controller; and
   renouncing the authorization of the first telephone to transmit voice data to the second telephone based on the request for renunciation of speech authority transmitted from the first telephone.

8. A telephone system transmitting voice data transmitted from an authorized telephone with speech authority to a plurality of unauthorized telephones without speech authority, the telephone system comprising:
   a speech authority controller configured to authorize and un-authorize telephones with speech authority to transmit voice data, and further configured to store telephone information specifying users of the telephones; and
   a telephone, of the telephones, connected to the speech authority controller by a network, the telephone including
      a transmitting unit configured to request authorization and un-authorization from the speech authority controller to transmit voice data, the speech authority controller, in response to an authorization request from a requesting telephone, authorizing the requesting telephone and un-authorizing all telephones other than the requesting telephone;
      a receiving unit configured to receive the telephone information specifying users of each of the authorized telephone and the unauthorized telephones from the speech authority controller;
      a display surface configured to display predetermined information based on the received telephone information; and
      a display controlling unit configured to specify a content of the predetermined information, based on the telephone information received by the receiving unit, and to display the content on the display surface,
      wherein the display controlling unit is configured to fixedly display user information to specify a user of the authorized telephone, in a partial region of the display surface, and to display at least part of user information to specify users of telephones except for the concerned telephone among the authorized telephone and the unauthorized telephones, in a remaining region except for the partial region of the display surface.

* * * * *